United States Patent [19]

Cameron et al.

[11] Patent Number: 4,734,388

[45] Date of Patent: Mar. 29, 1988

[54] GLASS FOR CATHODE RAY TUBE FACEPLATES

[75] Inventors: Robert A. Cameron, Corning; John H. Connelly, Horseheads, both of N.Y.

[73] Assignee: Corning Glass Works, Corning, N.Y.

[21] Appl. No.: 926,739

[22] Filed: Nov. 4, 1986

[51] Int. Cl.$^4$ .................... C03C 3/095; C03C 3/078; C04B 35/68
[52] U.S. Cl. ........................................ 501/64; 501/70; 501/71; 501/72; 313/480; 252/478
[58] Field of Search ................... 501/64, 72, 71, 70; 252/478; 313/480

[56] References Cited

FOREIGN PATENT DOCUMENTS 53-113813 10/1978 Japan ........................... 501/64

*Primary Examiner*—Mark L. Bell
*Attorney, Agent, or Firm*—C. S. Janes, Jr.

[57] ABSTRACT

The present invention relates to glass compositions suitable for cathode ray tube faceplates which are essentially free from readily reducible metal oxides, MgO, and fluorine, and which consist essentially, in weight percent on the oxide basis, of:

| | | | | | |
|---|---|---|---|---|---|
| $SiO_2$ | 60–63 | BaO | 5.5–8.5 | $ZrO_2 + Al_2O_3$ | >4–6.25 |
| $Li_2O$ | 0.25–0.8 | CaO | 1.5–4.0 | $Sb_2O_3$ | 0.25–0.55 |
| $Na_2O$ | 7.25–9.25 | $TiO_2$ | 0.25–0.75 | $As_2O_3$ | 0–0.25 |
| $K_2O$ | 6–8.25 | $ZrO_2$ | 4–6.25 | $Sb_2O_3 + As_2O_3$ | 0.35–0.75 |
| SrO | 5.5–8.5 | $Al_2O_3$ | 0–<2 | $CeO_2$ | 0.15–0.5. |

3 Claims, No Drawings

GLASS FOR CATHODE RAY TUBE FACEPLATES

BACKGROUND OF THE INVENTION

This invention is directed to glass compositions for use as cathode ray tube faceplates and, in particular, as faceplates for color television picture tubes.

Whereas the glass faceplate for a cathode ray tube of the type employed in color television picture tubes must exhibit transparency, a high degree of x-radiation absorption, and excellent resistance to discoloration caused by the bombardment of high velocity electrons thereupon and exposure to x-radiation, the process for fabricating cathode ray tubes dictates a matrix of physical properties which the glass should also satisfy. To illustrate:

The faceplate glass ought to demonstrate a coefficient of thermal expansion closely approximating that of glasses customarily used in the manufacture of cathode ray tubes, viz., greater than 97 but less than $100 \times 10^{-7}/°C.$ over the temperature range of 0°–300° C., in order to achieve satisfactory compatibility with those glasses and with the metal components which are sealed therein.

To minimize thermal distortion of the glass components during assembly of the tube, the glass should exhibit an annealing point of at least about 500° C. and a strain point of at least about 460° C.

To insure proper operation of the tube, the glass must manifest an electrical resistivity, expressed in terms of Log $\rho$, greater than 9 at 250° C. and greater than 7 at 350° C.

Where electric melting of the glass is envisioned, easily reducible metal oxides, especially PbO, will most preferably be essentially absent from the glass. It is believed that the inclusion of readily reducible metal oxides in the faceplate composition renders the glass susceptible to discoloration resulting from electron bombardment. Furthermore, whereas $As_2O_3$ is a very effective fining agent, because of its ready reducibility, a combination of $Sb_2O_3$ and $As_2O_3$ will be utilized for that purpose, with the level of $As_2O_3$ being held below 0.25% by weight.

MgO will also preferably be essentially absent from the glass. Although the mechanism therefor is not fully comprehended, the inclusion of MgO appears to render the glass more susceptible to devitrification.

Although fluorine has often functioned as a flux to assist in the melting process because its presence does not significantly affect the electrical resistivity or the thermal expansion of the glass (as do the alkali metals), volatilization of fluorine during melting of the glass batch creates a severe air pollution problem. Moreover, the presence of fluorine intensifies corrosion of the molds employed in forming the faceplates. Therefore, various modifications in batch materials have been explored to eliminate fluorine therefrom while achieving similar beneficial fluxing effects without sacrifice of electrical properties.

Finally, for ease in melting and forming, the glass should desirably exhibit as low a liquidus temperature as possible and, in order to form faceplates, should demonstrate a viscosity at the liquidus of at least 100,000 poises. The liquidus has been generally defined in the glass art as that temperature at which crystals begin to form as a glass melt is cooled. Hence, the onset of devitrification commences at the liquidus temperature. Accordingly, a low liquidus permits glass forming to be carried out at lower temperatures without fear of devitrification.

Glasses free from PbO and fluorine which have been used commercially in the production of cathode ray tube faceplates have customarily demonstrated internal liquidi in excess of 850° C. and, frequently, at temperatures in the vicinity of 900° C. It would, however, be highly desirable to produce glass compositions wherein the internal liquidus temperature would be below 850° C., but in which the remaining physical properties would remain essentially constant.

OBJECTIVE OF THE INVENTION

Therefore, the primary objective of the present invention is to provide glass compositions essentially free from MgO, fluorine, and readily reducible metal oxides which exhibit coefficients of thermal expansion (0°–300° C.) greater than 97 but less than $100 \times 10^{-7}/°C.$, annealing points of at least about 500° C., strain points of at least about 460° C., electrical resistivities (Log $\rho$) greater than 9 at 250° C. and greater than 7 at 350° C., and an internal liquidus temperature below 850° C. with a viscosity at the liquidus of at least 100,000 poises.

SUMMARY OF THE INVENTION

That objective can be accomplished through glass compositions essentially free from readily reducible metal oxides, MgO, and fluorine consisting essentially, expressed in terms of weight percent on the oxide basis, of

| | | | |
|---|---|---|---|
| $SiO_2$ | 60–63 | $ZrO_2$ | 4–6.25 |
| $Li_2O$ | 0.25–0.8 | $Al_2O_3$ | 0–<2 |
| $Na_2O$ | 7.25–9.25 | $ZrO_2 + Al_2O_3$ | >4–6.25 |
| $K_2O$ | 6–8.25 | $Sb_2O_3$ | 0.25–0.55 |
| SrO | 5.5–8.5 | $As_2O_3$ | 0–0.25 |
| BaO | 5.5–8.5 | $Sb_2O_3 + As_2O_3$ | 0.35–0.75 |
| CaO | 1.5–4.0 | $CeO_2$ | 0.15–0.5 |
| $TiO_2$ | 0.25–0.75 | | |

Colorants conventionally employed in cathode ray tube faceplate glasses, e.g., $Co_3O_4$, $Cr_2O_3$, and NiO, may also be included in the customary amounts, if desired. Such concentrations commonly range up to about 20 ppm (parts/million) $Co_3O_4$, up to about 20 ppm $Cr_2O_3$, and up to 250 ppm NiO.

The above ranges of base constituents must be strictly adhered to in order to produce glasses that can be formed into faceplates and which manifest physical properties satisfying the objective of the invention. The crux of the present invention is the discovery of the critical impact which $ZrO_2$ in amounts of at least 4%, and up to about 6.25%, has upon the properties of glasses having compositions coming within the above-cited ranges. Hence, whereas the capability of $ZrO_2$ to absorb x-radiation and to enhance the chemical durability of glasses is well-recognized, in the present glasses $ZrO_2$ acts to reduce the liquidus temperature while maintaining or even raising the thermal properties (annealing point and strain point) of the glasses.

The utility of $Al_2O_3$ in adjusting the viscosity of a glass and improving the chemical durability thereof has long been known. In the inventive compositions, however, $Al_2O_3$ can act in conjunction with $ZrO_2$ to reduce the liquidus temperature.

Maintenance of the other glass components within the cited regions is vital to produce glasses suitable for use as cathode ray tube faceplates and, in particular, as faceplates for color television picture tubes. For example, $TiO_2$ and $CeO_2$ impart protection to the glass against discoloration resulting from exposure to x-radiation. BaO, SrO, and $ZrO_2$ act as the primary absorbers of x-radiation. The levels of $Li_2O$, $Na_2O$, $K_2O$, and CaO are carefully balanced with respect to those constituents to produce glasses exhibiting the necessary viscosity characteristics for conventional melting and forming techniques accompanied with the other desired physical properties. As illustrative of the careful control that must be exercised, an increase in the content of $Na_2O$ and/or $K_2O$ reduces the viscosity of the glass at its liquidus. $Li_2O$ exerts an extremely potent action upon the Littleton softening point of the glass, while increasing the electrical resistivity, when present in conjunction with $Na_2O$ and $K_2O$. That combination of effects has been utilized to eliminate the need for fluorine as a fluxing agent in the glass. Because of that strong fluxing action, however, the content of $Li_2O$ must be carefully regulated. CaO acts to decrease the melting viscosity of the glass while increasing its electrical resistivity and raising the liquidus temperature thereof. Higher levels of SrO and BaO tend to reduce the liquidus viscosity of the glass.

In summary, the inclusion of $ZrO_2$ in amounts of at least 4% and up to about 6.25%, in compositions consisting essentially of the narrowly-circumscribed ranges cited above, yields glasses satisfying the above-stated objective of the invention. In the more preferred glasses the concentration of $Li_2O$ will be in excess of about 0.50% and the level of $ZrO_2 + Al_2O_3$ will range about 4.5–5.5%, thereby yielding glasses exhibiting liquidus temperatures below about 800° C.

As employed herein, the expression "essentially free from" is defined as indicating a concentration of less than 0.25% by weight.

PRIOR ART

U.S. Pat. No. 3,464,932 discloses glasses for use as television picture tube faceplates consisting essentially, in weight percent, of:

| $SiO_2$ | 40–70 | SrO | up to 20 | CaO + MgO + ZnO | 0–15 |
| $Na_2O$ | 0–10 | CaO | 0–15 | BaO | 0–20 |
| $K_2O$ | 0–13 | MgO | 0–15 | $Al_2O_3$ | 0–10 |
| $Na_2O$ + $K_2O$ | 4–20 | ZnO | 0–15 | $ZrO_2$ | 0–10 |

The sole reference to $Al_2O_3$ and $ZrO_2$ is that they may be present to raise the annealing point and to improve chemical durability of the glass.

U.S. Pat. No. 3,925,089 describes glasses for use as television picture tube faceplates consisting essentially, in weight percent, of:

| $SiO_2$ | 50–75 | SrO | 0–12 |
| $Al_2O_3$ | 0.5–6 | SrO + $ZrO_2$ + PbO + BaO | >8 |
| PbO | 0–15 | CaO + MgO | <5 |
| BaO | 0–15 | $Li_2O$ + $Na_2O$ + $K_2O$ | >13 |
| $ZrO_2$ | 0–8 | $B_2O_3$ | <1 |

No utility for $ZrO_2$ is indicated.

U.S. Pat. No. 3,987,330 is drawn to glasses for use as television picture tube faceplates consisting essentially, in weight percent, of:

| $SiO_2$ | 60–65 | CaO + MgO | 2–10 |
| $Al_2O_3$ | 0.5–5 | SrO | 4–10 |
| $Na_2O$ | 5–10 | BaO | 1–5 |
| $K_2O$ | 5–10 | PbO | 1–5 |
| MgO | 0–2 | $ZrO_2$ | 0.5–5 |

$ZrO_2$ was included for x-ray absorption with a preferred range of 1–3% to improve glass stability and ease in forming. It was also observed that $ZrO_2$ lowers the expansion, lowers the liquidus, and slightly increases the viscosity of the glasses. Nevertheless, the PbO is a required component and the BaO content is generally too low. Moreover, the greatest concentration of $ZrO_2$ in the working examples was 2.02%.

U.S. Pat. No. 4,015,966 is concerned with glass compositions suitable for floating on molten tin which consist essentially, in weight percent, of:

| $SiO_2$ | 60–65 | $K_2O$ | 0–17 | SrO | 5–15 |
| $Al_2O_3$ | 0–5 | CaO + MgO | 2–10 | $ZrO_2$ | 0–10 |
| $Na_2O$ | 2–10 | BaO | 0–5 | $WO_3$ | 0–5 |

$ZrO_2$ and $WO_3$ are stated to be useful for x-ray absorption and are not included in the preferred ranges of compositions.

U.S. Pat. No. 4,277,286 is directed to glasses for use as television picture tube faceplates consisting essentially, in weight percent, of:

| $SiO_2$ | 43–55 | $K_2O$ | 3–8 | BaO | 10–20 |
| $Al_2O_3$ | 0–4 | $Li_2O$ + $Na_2O$ + $K_2O$ | 10–18 | CaO + SrO + BaO | 16–30 |
| ZnO | 5–12 | CaO | 0–5 | $CeO_2$ | 0.3–1 |
| $Li_2O$ | 0.5–3 | SrO | 2–14 | $ZrO_2$ | 2–8 |
| $Na_2O$ | 4–8 | | | | |

$ZrO_2$ is included for x-ray absorption and none of the working examples contains as much as 4% $ZrO_2$.

U.S. Pat. No. 4,337,410 outlines glasses for use as television picture tube faceplates consisting essentially, in weight percent, of:

| $SiO_2$ | 57–65 | MgO | 0–4 | PbO | 0–1 |
| $Al_2O_3$ | 0–4 | CaO | 0–4 | $Sb_2O_3$ + $As_2O_3$ | 0–2 |
| $Na_2O$ | 5.5–8.0 | $ZrO_2$ | 1–4 | $TiO_2$ | 0.2–2.0 |
| $K_2O$ | 7.5–10.0 | SrO | 6–14 | $CeO_2$ | 0.05–1.0 |

A $ZrO_2$ content greater than 4% is warned against because it makes the glass less fusible. $ZrO_2$ is employed for x-ray absorption.

U.S. Pat. No. 4,376,829 delineates glasses for use as television picture tube faceplates consisting essentially, in weight percent, of:

| $SiO_2$ | 50–75 | $Pr_2O_3$ | 0.5–5 | $ZrO_2$ | 0–3 |
| $Al_2O_3$ | 0–5 | $Fe_2O_3$ | 0.1–4 | SrO + BaO + PbO + ZnO + $ZrO_2$ | 1.5–25 |
| CaO | 0–4 | SrO | 0–12 | $Li_2O$ | 0–4 |
| MgO | 0–2 | BaO | 0–16 | $Na_2O$ | 3–15 |
| $TiO_2$ | 0–2 | PbO | 0–3 | $K_2O$ | 1–10 |
| $CeO_2$ | 0.1–3 | ZnO | 0–3 | $Li_2O$ + $Na_2O$ + $K_2O$ | 5–24 |
| $Nd_2O_3$ | 1–10 | | | | |

$ZrO_2$ is included for x-ray absorption and levels in excess of 3% $ZrO_2$ are stated to lead to poor glass melting.

U.S. Pat. No. 4,390,637 refers to glasses for use as television picture tube faceplates consisting essentially, in weight percent, of:

| | | | | | |
|---|---|---|---|---|---|
| $SiO_2$ | 50–75 | $Cr_2O_3$ | 0.0005–0.05 | $ZrO_2$ | 0–4 |
| $Al_2O_3$ | 0–5 | $Pr_6O_{11}$ | 0–2 | $SrO + BaO + PbO + ZnO + ZrO_2$ | 5–25 |
| CaO | 0–4 | SrO | 0–13 | $Li_2O$ | 0–4 |
| MgO | 0–3 | BaO | 0–16 | $Na_2O$ | 3–15 |
| $TiO_2$ | 0–2 | PbO | 0–3 | $K_2O$ | 2–15 |
| $CeO_2$ | 0–3 | ZnO | 0–3 | $Na_2O + K_2O$ | 5–20 |
| $Nd_2O_3$ | 0.1–5.0 | | | | |

$ZrO_2$ is present for x-ray absorption and the patent warns that more than 4% $ZrO_2$ results in poor glass melting.

British Pat. No. 1,396,223 presents glasses for use as television picture tube faceplates consisting essentially, in weight percent, of

| | | | | | |
|---|---|---|---|---|---|
| $SiO_2$ | 64–67 | $K_2O$ | 5–9 | SrO | 0–6 |
| $Al_2O_3$ | 0–1 | $Na_2O + K_2O$ | 13–17 | $ZrO_2$ | 2–6 |
| F | 0.3–1.5 | $As_2O_3 + Sb_2O_3$ | 0–1 | $BaO + 2SrO + 2ZrO_2$ | >18 |
| $Na_2O$ | 6–10 | BaO | 9–14 | $SrO + ZrO_2$ | 2–8 |

Fluoride is a required component, the SrO content is generally too low, the BaO content is generally too high, and there is no mention of the effect of $ZrO_2$ upon the liquidus of the glasses.

Japanese Patent Application No. 53-113813 (1978) discusses glasses for use in television picture tube faceplates consisting essentially, in weight percent, of:

| | | | | | |
|---|---|---|---|---|---|
| $SiO_2$ | 58–66 | BaO | 4.5–7.5 | $CeO_2$ | 0.1–1 |
| $Al_2O_3$ | 0.3–3 | SrO | 5–12 | $As_2O_3$ | 0–1 |
| $Li_2O$ | 0.1–2 | MgO | 0–4 | $Sb_2O_3$ | 0–1 |
| $Na_2O$ | 6.5–9.5 | CaO | 0–4 | $TiO_2$ | 0–1 |
| $K_2O$ | 6–9.5 | $ZrO_2$ | 1–5.5 | | |

Fluorine and PbO are stated to be desirably absent. $As_2O_3$ is indicated as being useful as a fining agent and is present in each of the working examples. MgO is asserted to be useful for adjusting the viscosity curve of the glass, and the preferred compositions require the inclusion of MgO. 1.5–3% $ZrO_2$ is stated to be optimal for x-ray absorption and improving weatherability. Above 5% results in devitrification. No working example contains more than 2.5% $ZrO_2$.

DESCRIPTION OF PREFERRED EMBODIMENTS

The table below records a number of glass compositions, expressed in terms of parts by weight on the oxide basis, illustrating parameters of the invention. Because the sum of the individual constituents closely approximates 100, for all practical purposes the tabulated values may be considered to represent weight percent. The ingredients actually making up the batch for each glass may comprise any materials, either oxides or other compounds, which, when melted together, will be converted into the desired oxides in the proper proportions. The minuscule amounts of MgO recorded were derived from impurities in the batch materials and were not intentionally added. Concentrations of $TiO_2$ and $CeO_2$ were included in each batch in amounts conventionally present in faceplates for color television picture tubes to impart resistance to discoloration caused by exposure to x-radiation (about 0.5% $TiO_2$ and 0.3% $CeO_2$). Concentrations of $Co_3O_4$ and NiO were also included in each batch in amounts conventionally present in faceplates for color television picture tubes to impart a neutral gray coloration therein (about 0.0005% $Co_3O_4$ and 0.0004% NiO). Finally, about 0.2% $As_2O_3$ and about 0.35% $Sb_2O_3$ were incorporated into each batch to perform their customary function of fining the glass. Because it is not known with which cation(s) the very minor amounts of fluorine are combined, they are merely reported in terms of fluoride in accordance with conventional glass analysis practice.

The batch ingredients were compounded, tumble mixed together to assist in securing a homogeneous melt, and then charged into platinum crucibles. The crucibles were introduced into a furnace operating at about 1550° C. After melting for about four hours, the melts were stirred for about 15 minutes, and then allowed to remain at rest for about 15–20 minutes to fine the glass. Thereafter, the melts were poured into steel molds to form glass slabs having dimensions of about 6″×6″×0.5″, and those slabs were transferred immediately to an annealer operating at about 525° C. Specimens were subsequently cut from the slabs for use in the determination of several physical properties.

The table also reports measurements of physical properties carried out on the specimens. Hence, values of softening point (Soft.), annealing point (Ann.), and strain point (Str.), all in °C., linear coefficient of thermal expansion between 0°–300° C. (Exp.) in terms of $\times 10^{-7}$/°C., internal liquidus temperature in °C. (Liq.) determined utilizing a platinum boat in a gradient furnace, electrical resistivity, expressed in terms of Log $\rho$, measured at 250° C. and 350° C., and the temperature at which the glass exhibits a viscosity (Vis.) of 100,000 poises, are included where measured and/or as calculated from the low temperature viscosity properties of the glass. It will be appreciated that in those glasses where the liquidus temperature is below the temperature at which the glass displays a viscosity of 100,000 poises, the viscosity of the glass at the liquidus temperature will be greater than 100,000 poises.

TABLE

| | 1 | 2 | 3 | 4 | 5 | 6 |
|---|---|---|---|---|---|---|
| $SiO_2$ | 61.08 | 61.06 | 61.08 | 60.83 | 61.38 | 57.68 |
| $Al_2O_3$ | 2.00 | 2.00 | 2.00 | 1.50 | 2.00 | 2.11 |
| $Li_2O$ | 0.70 | 0.50 | 0.1 | 0.45 | 0.50 | 0.6 |
| $Na_2O$ | 7.25 | 8.25 | 10.25 | 8.85 | 8.45 | 9.0 |
| $K_2O$ | 7.90 | 7.10 | 5.5 | 7.10 | 7.10 | 7.5 |
| MgO | 0.02 | 0.02 | 0.02 | 0.02 | 0.02 | 0.04 |
| CaO | 1.80 | 1.80 | 1.80 | 2.79 | 1.80 | 3.80 |
| SrO | 9.70 | 9.70 | 9.70 | 8.7 | 10.20 | 6.7 |
| BaO | 5.70 | 5.70 | 5.70 | 5.7 | 4.70 | 5.7 |
| $ZrO_2$ | 2.50 | 2.50 | 2.50 | 3.0 | 3.50 | 5.5 |
| F | — | 0.04 | — | — | — | 0.04 |
| Soft. | 694 | 690 | 698 | 695 | 697 | 704 |
| Ann. | 511 | 508 | 518 | 516 | 513 | 526 |
| Str. | 471 | 466 | 476 | 474 | 473 | 485 |
| Exp. | 97.5 | 97.4 | 100.4 | 100.5 | 97.0 | 100.7 |
| Liq. | 880 | 855 | 795 | 847 | 866 | 934 |
| Log $\rho$ | | | | | | |
| 250 | 9.460 | 9.215 | 8.461 | 9.120 | 9.105 | 9.11 |
| 350 | 7.520 | 7.280 | 6.695 | 7.235 | 7.235 | 7.185 |
| Vis. | 889 | 887 | 892 | 888 | 893 | 894 |

| | 7 | 8 | 9 | 10 | 11 | 12 |
|---|---|---|---|---|---|---|
| $SiO_2$ | 60.41 | 60.66 | 61.01 | 60.16 | 58.67 | 60.09 |
| $Al_2O_3$ | 1.11 | 0.11 | 0.11 | 1.11 | 2.10 | 2.11 |
| $Li_2O$ | 0.75 | 0.75 | 0.60 | 0.90 | 0.75 | 0.75 |
| $Na_2O$ | 9.05 | 9.6 | 9.30 | 9.15 | 10.8 | 10.5 |
| $K_2O$ | 7.3 | 7.50 | 7.30 | 7.30 | 6.3 | 8.0 |

TABLE-continued

|     | | | | | | |
| --- | --- | --- | --- | --- | --- | --- |
| MgO | 0.73 | 0.03 | — | — | 0.03 | 0.03 |
| CaO | 1.07 | 1.80 | 1.80 | 1.84 | 1.8 | 1.8 |
| SrO | 6.5 | 6.0 | 6.03 | 6.03 | 6.0 | 9.15 |
| BaO | 6.2 | 6.2 | 6.2 | 6.2 | 6.2 | 0.11 |
| $ZrO_2$ | 5.5 | 6.0 | 6.0 | 6.0 | 6.0 | 6.0 |
| F | 0.04 | — | 0.2 | — | — | 0.2 |
| Soft. | 692 | 695 | 688 | 695 | 691 | 695 |
| Ann. | 505 | 508 | 507 | 512 | 511 | 512 |
| Str. | 463 | 469 | 468 | 472 | 472 | 471 |
| Exp. | 99.0 | 99.0 | 98.7 | 98.5 | 101.3 | 101.2 |
| Liq. | 926 | 831 | 1004 | 1039 | 715 | 995 |
| Log ρ | | | | | | |
| 250 | 8.92 | 8.75 | 8.89 | 8.955 | 8.375 | 8.465 |
| 350 | 7.03 | 6.875 | 7.01 | 7.065 | 6.585 | 6.635 |
| Vis. | 895 | 894 | 880 | 890 | 882 | 892 |

|     | 13 | 14 | 15 | 16 | 17 | 18 |
| --- | --- | --- | --- | --- | --- | --- |
| $SiO_2$ | 60.20 | 59.73 | 60.16 | 57.96 | 58.65 | 61.13 |
| $Al_2O_3$ | 2.11 | 0.08 | 1.11 | 0.11 | 0.12 | 1.02 |
| $Li_2O$ | 0.75 | 0.75 | 0.90 | 0.85 | 0.75 | 0.60 |
| $Na_2O$ | 10.5 | 9.3 | 9.05 | 9.70 | 10.0 | 8.60 |
| $K_2O$ | 8.0 | 7.7 | 7.30 | 7.90 | 9.5 | 7.10 |
| MgO | 0.03 | 0.04 | 0.73 | — | 0.03 | 0.02 |
| CaO | 1.8 | 3.8 | 1.07 | 1.80 | 1.80 | 1.80 |
| SrO | 9.15 | 7.1 | 6.00 | 6.03 | 3.1 | 7.70 |
| BaO | 0.11 | 4.13 | 6.20 | 6.20 | 6.2 | 6.70 |
| $ZrO_2$ | 6.0 | 6.0 | 6.0 | 8.0 | 8.5 | 4.0 |
| F | — | 0.04 | — | — | — | — |
| Soft. | 700 | 694 | 694 | 697 | 702 | 693 |
| Ann. | 518 | 518 | 506 | 518 | 510 | 511 |
| Str. | 476 | 478 | 466 | 478 | 470 | 471 |
| Exp. | 101.7 | 101.0 | 98.6 | 110.8 | 103.3 | 98.2 |
| Liq. | >1032 | 1033 | 947 | 1174 | >948 | 773 |
| Log ρ | | | | | | |
| 250 | 8.415 | 9.065 | 8.920 | 8.85 | 8.53 | 9.035 |
| 350 | 6.595 | 7.13 | 7.02 | 6.955 | 6.685 | 7.145 |
| Vis. | 896 | 881 | 895 | 887 | 908 | 887 |

|     | 19 | 20 | 21 | 22 | 23 | 24 |
| --- | --- | --- | --- | --- | --- | --- |
| $SiO_2$ | 61.09 | 61.06 | 61.25 | 60.4 | 61.23 | 60.42 |
| $Al_2O_3$ | 1.02 | 1.01 | 0.10 | 0.55 | 0.08 | 1.02 |
| $Li_2O$ | 0.6 | 0.6 | 0.75 | 0.55 | 0.75 | 0.40 |
| $Na_2O$ | 8.6 | 8.6 | 8.75 | 8.55 | 9.00 | 8.60 |
| $K_2O$ | 7.1 | 7.1 | 7.25 | 8.0 | 7.50 | 7.70 |
| MgO | 0.02 | 0.02 | 0.03 | 0.02 | 0.02 | 0.02 |
| CaO | 1.80 | 1.95 | 2.30 | 2.05 | 2.3 | 1.80 |
| SrO | 7.7 | 7.7 | 7.05 | 6.60 | 7.05 | 7.70 |
| BaO | 6.7 | 6.55 | 6.70 | 6.85 | 5.7 | 6.70 |
| $ZrO_2$ | 4.0 | 4.0 | 4.50 | 5.00 | 5.0 | 4.0 |
| F | 0.04 | 0.2 | — | 0.04 | 0.04 | 0.04 |
| Soft. | 691 | 687 | 688 | 695 | 689 | 696 |
| Ann. | 509 | 506 | 507 | 511 | 509 | 513 |
| Str. | 469 | 466 | 465 | 469 | 470 | 471 |
| Exp. | 98.9 | 98.7 | 99.7 | 98.7 | 99.2 | 99.1 |
| Liq. | 695 | 765 | 792 | 817 | 696 | 736 |
| Log ρ | | | | | | |
| 250 | 9.21 | 9.14 | 9.21 | 9.11 | 9.085 | 9.07 |
| 350 | 7.255 | 7.215 | 7.255 | 7.21 | 7.145 | 7.170 |
| Vis. | 886 | 881 | 884 | 886 | 880 | 894 |

|     | 25 | 26 | 27 | 28 | 29 |
| --- | --- | --- | --- | --- | --- |
| $SiO_2$ | 60.17 | 60.62 | 60.27 | 60.82 | 60.62 |
| $Al_2O_3$ | 0.07 | 1.02 | 0.07 | 1.02 | 1.02 |
| $Li_2O$ | 0.60 | 0.50 | 0.60 | 0.60 | 0.50 |
| $Na_2O$ | 9.00 | 8.10 | 8.90 | 8.60 | 8.60 |
| $K_2O$ | 7.90 | 8.10 | 7.90 | 7.10 | 7.40 |
| MgO | 0.02 | 0.02 | 0.02 | 0.02 | 0.02 |
| CaO | 2.30 | 1.80 | 2.30 | 1.80 | 1.80 |
| SrO | 5.50 | 7.70 | 6.50 | 7.70 | 7.70 |
| BaO | 7.00 | 6.70 | 6.00 | 6.70 | 6.70 |
| $ZrO_2$ | 6.00 | 4.00 | 6.00 | 4.00 | 4.00 |
| F | 0.04 | 0.04 | 0.04 | 0.04 | 0.04 |
| Soft. | 695 | 696 | 697 | 689 | 693 |
| Ann. | 512 | 511 | 514 | 507 | 510 |
| Str. | 469 | 468 | 471 | 466 | 469 |
| Exp. | 99.7 | 99.2 | 99.3 | 99.0 | 99.3 |
| Liq. | 774 | 720 | 797 | <721 | 760 |
| Log ρ | | | | | |
| 250 | 9.010 | 9.220 | 9.055 | 9.095 | 9.090 |
| 350 | 7.110 | 7.310 | 7.165 | 7.195 | 7.200 |
| Vis. | 894 | 897 | 896 | 885 | 890 |

As can be adjudged from an inspection of the above table, very minor variations in composition beyond the specified ranges of components yield glasses exhibiting melting and forming behavior and physical properties outside of those desired. Only Examples 18-29 demonstrate the required matrix of such with Example 18 being the most preferred composition.

We claim:

1. A glass essentially free from readily reducible metal oxides, MgO, and fluorine suitable for manufacturing faceplates for cathode ray tubes which exhibits a linear coefficient of thermal expansion (0°-300° C.) greater than 97 but less than $100 \times 10^{-7}/°C$., an annealing point of at least about 500° C., a strain point of at least about 460° C., a Log ρ at 250° C. greater than 9, a Log ρ at 350° C. greater than 7, an internal liquidus temperature below 850° C., and a liquidus viscosity of at least 100,000 poises, said glass consisting essentially, expressed in terms of weight percent on the oxide basis, of:

| | | | | | |
| --- | --- | --- | --- | --- | --- |
| $SiO_2$ | 60-63 | BaO | 5.5-8.5 | $ZrO_2 + Al_2O_3$ | >4-6.25 |
| $Li_2O$ | 0.25-0.8 | CaO | 1.5-4.0 | $Sb_2O_3$ | 0.25-0.55 |
| $Na_2O$ | 7.25-9.25 | $TiO_2$ | 0.25-0.75 | $As_2O_3$ | 0-0.25 |
| $K_2O$ | 6-8.25 | $ZrO_2$ | 4-6.25 | $Sb_2O_3 + As_2O_3$ | 0.35-0.75 |
| SrO | 5.5-8.5 | $Al_2O_3$ | 0-<2 | $CeO_2$ | 0.15-0.5 |

2. A glass according to claim 1 also containing up to 20 ppm $Co_2O_4$ and/or up to 20 ppm $Cr_2O_3$ and/or up to 250 ppm NiO.

3. A glass according to claim 1 wherein the concentration of $Li_2O$ is in excess of about 0.50% and the level of $ZrO_2 + Al_2O_3$ ranges about 4.5-5.5%.

* * * * *